United States Patent [19]

Andrews

[11] 4,015,359
[45] Apr. 5, 1977

[54] HOOK BAITING MACHINE

[76] Inventor: Donald Andrews, P.O. Box 88, Topsail, Newfoundland, Canada

[22] Filed: July 18, 1975

[21] Appl. No.: 597,284

[52] U.S. Cl. .................................................. 43/4
[51] Int. Cl.² ....................................... A01K 97/00
[58] Field of Search ................................ 43/4, 4.5

[56] References Cited

UNITED STATES PATENTS

| 2,511,828 | 6/1950 | Andrist ........................................ 43/4 |
| 2,670,556 | 3/1954 | Hopkins et al. ........................... 43/4 |

*Primary Examiner*—Warner H. Camp
*Attorney, Agent, or Firm*—W. Charles Kent

[57] ABSTRACT

Apparatus for baiting fishing hooks attached at spaced intervals by snoods to a long line comprising guide means for receiving the lines, snoods and eyes of the hooks to channel them longitudinally and unobstructedly through said apparatus and restrict them against lateral displacement out of the guide means. Orienting and tensioning means, laterally offset from the guide means, momentarily engage each hook to progressively rotatably orient it while increasing the tension on the hook and its associated snood. As the hook then leaves the orienting and tensioning means, it flips into a baiting chamber to securely impale bait supplied thereto. The baited hook leaves the apparatus together with the snood and main line, thus reducing the chance of loss of bait by a whiplash action, in which the hook and snood have to be separated from the main line before passing through the baiter. In addition, according to the present invention, the hook orientation is carefully controlled from the moment the hook enters the apparatus to the moment it leaves the orienting and tensioning means, to ensure effective baiting.

11 Claims, 5 Drawing Figures

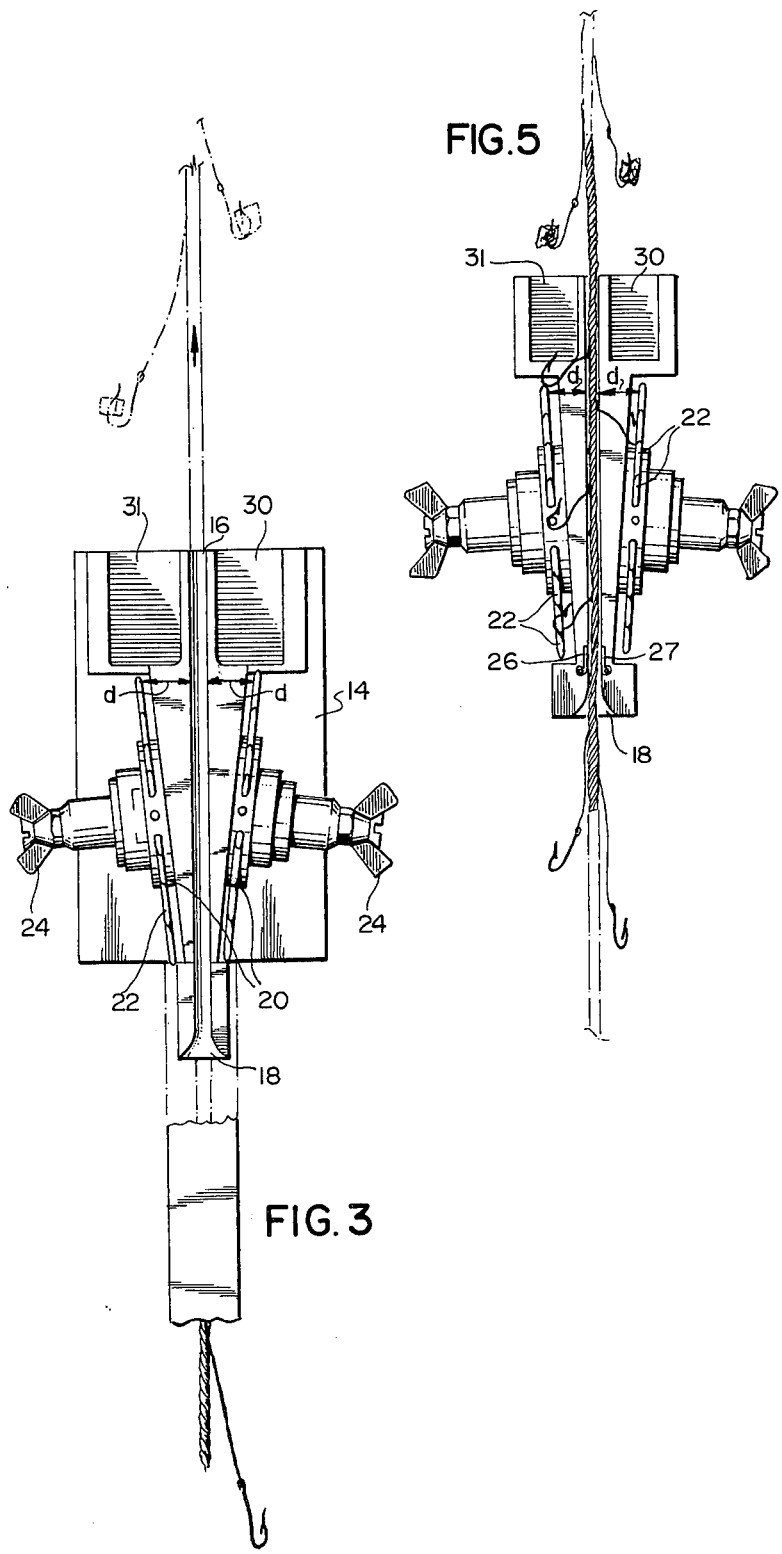

HOOK BAITING MACHINE

Background of the Invention

This invention relates to apparatus for automatically baiting fishing hooks, and more particularly concerns apparatus for use, for example, on commercial fishing craft to bait fish hooks attached at spaced intervals by snoods to a main or long line.

In the past, where natural bait has been used, it has been customary to bait the hooks attached to such line by hand. Hand baiting of such hooks ensures that, where natural bait is used, the hook goes through one side of the bait and out the other thus twice piercing the skin of the bait, which is the toughest part thereof. Such "double-hooking" is most desirable to ensure that the bait will be securely fastened on the hook. Manual baiting of individual hooks is a slow, labourious and potentially hazardous operation, whether natural or artificial bait is used.

Heretofore, attempts have been made to design automatic or mechanical baiting devices which would speed up the process of placing natural or artificial bait on such hooks and at the same time reduce human handling of the potentially hazardous hooks. For instance, Canadian Pat. Nos. 470,991 of Andrist and 470,993 of Hopkins et al., as well as U.S. Pat. Nos. 3,841,011 of Tison and 3,377,733 of Godo describe different apparatus for baiting hooks wherein the long lines and hooks are dragged through bait chambers where the bait is snagged. Unfortunately, in view of the fact that the hooks are dragged through the chambers, the necessary motion of the hook required to achieve double hooking of the bait is not effected, so that the bait (especially where the natural bait is used) is not as securely impaled upon the hook as would be the case with manual baiting.

Canadian Pat. No. 863,580 of Hanson et al., on the other hand, describes a baiting machine designed to double hook the bait. In that device, the moving hook snags the bait in a rotatable bait holder and the continuing motion of the hook causes the bait holder and bait to rotate in such a manner that the hook double hooks the bait. This mechanism, however, requires that the hook and snood be separated from the main line before passing through the baiter, increasing the chances of loss of bait by a "whiplash" action as the snood, baited hook and line leave the baiter and go over the boat into the sea.

SUMMARY OF THE INVENTION

In accordance with the present invention, apparatus is provided for baiting fish hooks attached at spaced intervals by snoods to a long line, comprising guide means for receiving the lines, snoods and eyes of the hooks to channel them longitudinally and unobstructedly through said apparatus and restrict them against lateral displacement out of the guide means. Orienting and tensioning means, laterally offset from the guide means, momentarily engage each hook to progressively, rotatably laterally orient its shank and point while increasing the tension on the hook and its associated snood. As the hook then leaves the orienting and tensioning means, it has been properly oriented and tensioned so that it flips into a baiting chamber and securely impales bait supplied thereto.

In addition to the fact that the apparatus according to the present invention permits mechanical impaling or double-hooking of bait for long-lining operations, there will be less chance of loss of bait from the hook as it leaves the machine, whether natural or artificial bait is used, by the aforementioned whiplash action found with some previously known devices since in the present invention, the main line, snood and eye of the hook are maintained together in the guide means as they pass through the apparatus.

BRIEF DESCRIPTION OF THE DRAWINGS

Other objects and advantages of the invention will become apparent upon reading the following detailed description and upon referring to the drawings in which:

FIG. 3 is a partial plan view of the lower portion of the apparatus illustrated in FIG. 1;

FIG. 5 is a schematic representation illustrating the progressive motion of a hook as it passes through the orienting and tensioning means and is baited.

In the drawings similar features have been given similar reference numerals.

Figure 1:
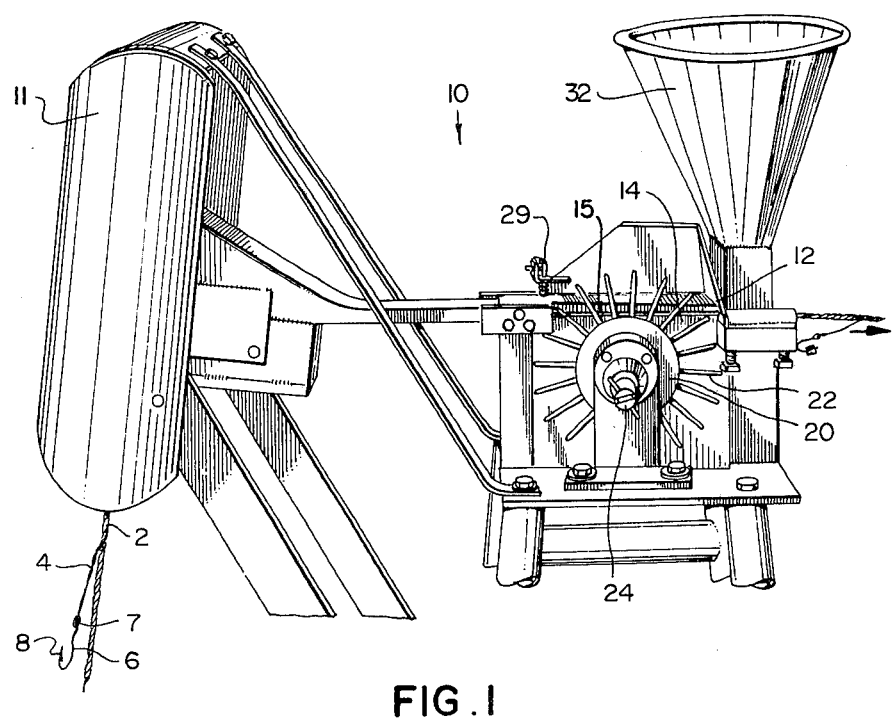
FIG. 1 is a side perspective view of an example embodiment of an automatic fish baiting device according to the present invention.

While the invention will be described in connection with a preferred example embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

In the drawings, main line 2 having snoods 4 and hooks 6 (with eyes 7 and points 8) at spaced intervals is drawn through automatic baiting machine 10. Funnel means 11, beside the entrance end of the machine, aligns the main line, snoods, and hooks before they enter the machine. Machine 10 is made up of spaced plates 12 and 14 in which is a centrally, longitudinally disposed groove 16 of sufficient size to permit unobstructed passage therethrough of line 2, snoods 4 and eyes 7 of hooks 6. The space or clearance 15 between the plates is sufficiently large to permit passage therethrough of the shank and curved portion of the hook but not large enough to permit simultaneous passage therethrough of the eye of the hook which is therefore constrained within groove 16 during passage through the machine. Entrance 18 to groove 16 is flared and smoothly contoured (as can be seen in FIG. 3, with respect to lower plate 14) to channel the main line snoods and eyes of the hooks into the groove and prevent the hooks from becoming caught on any edges as they enter the machine.

Centrally and laterally spaced on each side of plates 12 and 14 and groove 16 is an orienting and tensioning wheel 20 from which spaced, aligned spokes 22 project radially. Brake means 24 associated with each wheel 20 can be adjusted to restrict the rotation of the wheel 20 to any predetermined degree thereby causing tension on each hook and its associated snood while the hook is engaged with a spoke 22. Spokes 22 have smooth surfaces, slightly tapered free ends and are of sufficient size and strength to rotate braked wheel 20 during engagement with a hook 6 as the line is drawn through the machine.

The direction of rotation of spokes 22 is at a slight angle to the longitudinal axis of groove 16. In the embodiment shown, this angle is about 8°. As will be explained subsequently, this angle is selected so that for a given size of hooks, proper orientation and positioning of each hook, for securing bait, as it leaves engagement with a spoke 22 is achieved.

Figure 4:
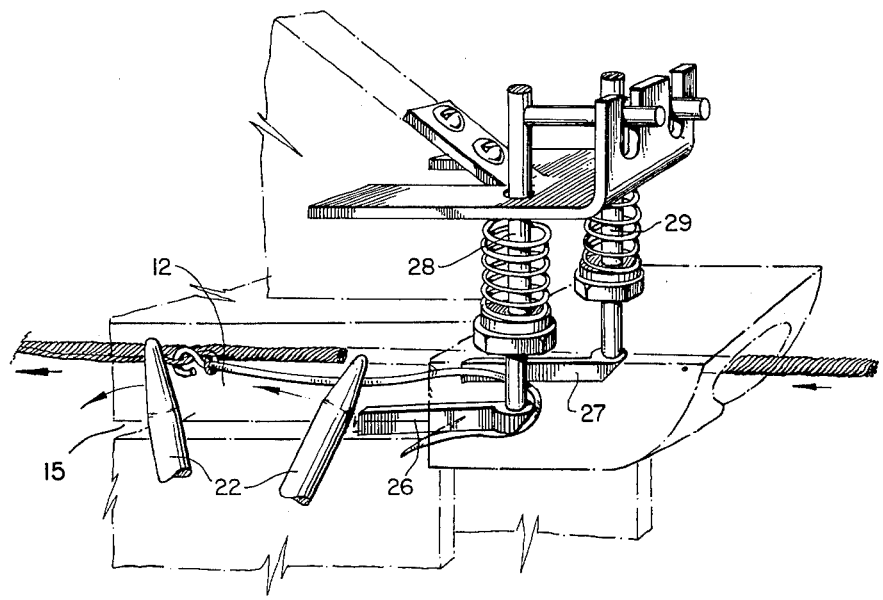
FIG. 4 is an enlarged fragmentary detailed view showing the operation of the hook guide means located towards the entrance of the apparatus of FIG. 1.

As illustrated in FIG. 4, co-operating with wheels 20, towards the entrance of the machine are hook guide means consisting of rudder-like levers 26 and 27 rigidly associated with spring loaded pins 28 and 29 respectively. Pins 28 and 29 slide vertically in holes in upper plate 12 and the springs serve to return the pin and associated lever to the fully "down" position after a hook has passed underneath. Contact of either lever 26 or 27 by the curved portion of a hook will push the lever up against its associated spring loaded pin into any suitable cooperating space in plate 12 and permit passage of the curved portion of the hook under the lever in question into the space between plates 12 and 14. The forward surface of both levers is cut at an angle of 45° so that a hook with the proper orientation will lift it and slide underneath. It will be noted from FIG. 5 that the back ends of these levers are slightly inwardly oriented, increasingly obstructing groove 16 in the direction of motion of the main line. As levers 26 and 27 normally are positioned in the space between plates 12 and 14, the lever which is not lifted by the passage of the curved portion of the hook bears against the shank portion of that hook as it passes by, urging the hook towards engagement with a spoke 22 on the opposite side of the groove thereto. This ensures that the hook does not move laterally out of the space between plates 12 and 14 and thus fail to engage the spoked wheel.

As the hook, thus engaged about spoke 22, moves through the apparatus, the shank or curved portion of the hook passes along this space while the eye of the hook, associated snood and line remains restricted against lateral movement in groove 16. Meanwhile the point shank and curved portion of the hook are progressively laterally outwardly displaced through the action of spoke 22 as it rotates about the axis of wheel 20 while engaging the hook.

Figure 2:
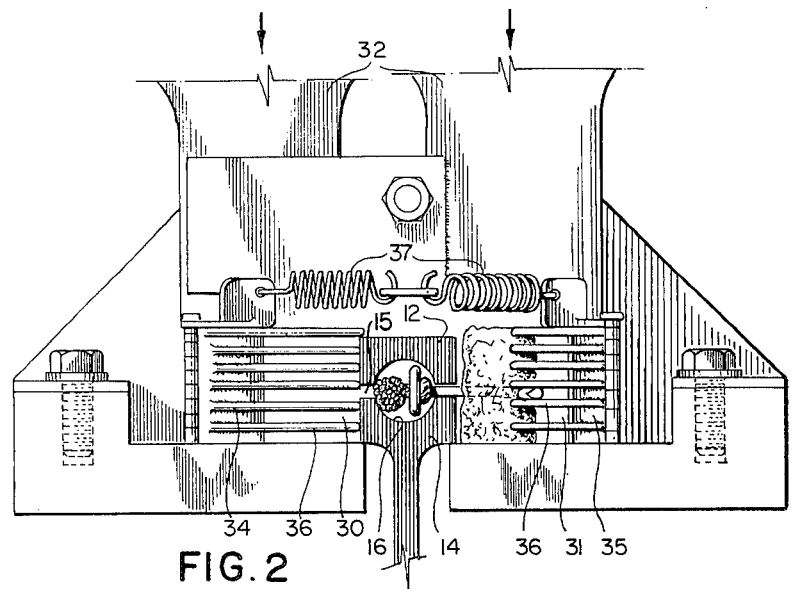
FIG. 2 is an enlarged elevational view of the end of apparatus according to FIG. 1 from which line, snoods and baited hooks leave the apparatus.

Towards the exit end of the groove 16 and laterally spaced therefrom are baiting chambers 30 and 31 (FIGS. 2 and 3) into which bait is fed from bait hoppers 32. Spring-yieldable gates 34 and 35 respectively releasably close the exits from these chambers, each gate comprising a series of laterally disposed spaced fingers 36 hinged at their base. Suitable tension springs 37 each urge a gate closed to offer resistance against the momentum of a hook as it impales a piece of bait in a chamber, but permits the opening of the gate against its bias to enable hooked bait to be drawn from that chamber by the continuing drag of the line.

Spaced plates 12 and 14 provide sufficient clearance for the curved portion of the hook, as well as its shank and point, to enter the appropriate chamber.

In operation, as main line 2 is drawn through the apparatus (for example as a result of the forward movement of a fishing boat upon which the machine is mounted, when a portion of the main line is in the water), this main line, snoods 4 and eyes 7 of hooks 6 are drawn together through the progressively narrowing entrance 18 and are constrained within groove 16. The contours of the surfaces of the entrance are such that, when the hook reaches either of levers 26 or 27, most of its shank portion and curved portion will be lying between the facing inner surface of plates 12 and 14, its point turned either to the left or right. Contact with the lever 26 or 27 pushes the lever up against spring loaded pin 28 or 29 so that the hook passes under the lever. The other lever and spring loaded pin are not activated by the hook, and this lever prevents movement of the hook away from the spoked wheel 20 which it is engaging, so that the hook is now properly aligned to engage one of spokes 22 of this wheel.

As the hook continues to be drawn through the machine, its shank and curved portion remain in the plane of the space between the inner surface of plates 12 and 14, and its eye, being perpendicular thereto, is consequently restricted in groove 16 against lateral movement. As the hook then becomes temporarily engaged about a spoke 22 of wheel 20, causing rotation of the wheel, the point and curved portion of the hook are progressively drawn away from groove 16 because of the direction of rotation of the wheel. At the same time, brake means 24 restricts and controls the wheel's rotation, increasing the tension on the hook and the corresponding snood. As the wheel continues to rotate, spoke 22 reaches a position at which hook 6 is free to slide out of engagement therewith. The point of the hook will have begun to enter the bait at the instant the hook leaves the spoke. The offset distance $d$ (seen in FIGS. 3 and 5) from spoke 22, as the hook slides off this spoke to enter the baiting chamber, to the sides of groove 16 opposite thereto, as well as the braking force of adjustable brake means 24 restricting the forward motion of each hook, are predetermined to orient and tension each hook so that it will flip off spoke 22 to securely impale or to bait in the baiting chamber. Distance $d$ depends upon the length of the hook shanks and other physical dimensions of the hooks.

The hook, as it enters the baiting chamber is positioned and has sufficient thrust to impale the bait securely or to pierce the skin of natural bait twice. Gate 34 or 35, with spaced fingers 36 provides resistance to hold the bait within the corresponding baiting chamber during baiting so that the barb of the hook which has already pierced the bait on one side will pierce it on the other as well, before the baited hook leaves the chamber. The spaced fingers also ensure that the point of the hook does not come into contact with anything which might dull its point, and, if necessary, allows the point of the hook to exit through the fingers 36 of the spring loaded gates as the bait is being impaled.

It is an important feature of the present invention that the baited hook leaves the apparatus in proximity with the snood and main line, thus reducing the chance of loss of bait by a whiplash action, as found in some prior art devices in which the hook and snood have to be separated from the main line before passing through the baiter. In addition, it is important according to the present invention that the hook orientation is carefully controlled from the moment the hook enters the apparatus to the moment its point enters the bait, thereby ensuring effective baiting.

Thus it is apparent that here has been provided in accordance with the invention an automatic baiting machine that fully satisfies the objects, aims and advantages set forth above. While the invention has been described in conjunction with the embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What I claim as my invention is:

1. Apparatus for mechanically baiting fish hooks attached at spaced intervals by snoods to a long line comprising: guide means having a longitudinal axis, for receiving and circumscribing said line, snoods and eyes of the hooks to channel them longitudinally and unobstructedly through said apparatus while restricting them against lateral displacement from said guide means, said guide means comprising a longitudinal channel extending through said apparatus, at least one side of said channel having a parallel lateral clearance of sufficient width and depth to permit passage therethrough of the shank of each hook;

orienting and tensioning means laterally offset from said guide means beside a central portion thereof, which means comprises a moving spoke, to momentarily intercept each hook as it passes through the apparatus, the position and motion of said spoke being such that the shank and point of each intercepted hook is progressively rotatably and laterally oriented and such that the tension on the hook and associated snood is increased;

and a baiting chamber having an exit gate to hold bait within, positioned to receive the hook as it leaves said hook orienting and tensioning means, said spoke releasing said intercepted hook when the orientation of and tension on the hook and associated snood is such that the hook can securely impale said bait within said chamber, said impaled bait leaving said baiting chamber through said exit gate.

2. Apparatus according to claim 1 wherein said guide means comprise opposed grooves in the facing surfaces of spaced plates, the space between said plates providing said lateral clearance sufficient to allow sliding passage of the shank and the curved portions of the said hooks, but insufficient for simultaneous passage therethrough of the eyes of the said hooks.

3. Apparatus according to claim 2 wherein means positioned within and associated with said guide means restrict each said hook against lateral movement within said space between said plates and urges said hook towards said means laterally offset from said guide means to ensure that said each hook is intercepted by said orienting and tensioning means.

4. Apparatus according to claim 4 wherein said means positioned within and associated with said guide means includes a vertically displaceable lever positioned on each side of said longitudinal channel in the space between said spaced plates, each said lever being displaceable into a cooperating space in one of said plates, said levers cooperating with each other so that one lever is displaced under urging from a hook to permit passage of the hook while said other lever restricts the lateral displacement of said hook within said space between said spaced plates and ensures that said hook is properly aligned for interception by said orienting and tensioning means.

5. Apparatus according to claim 1 wherein said orienting and tensioning means comprise a series of movable spaced, aligned spokes, the direction of motion of which is such that as the line is drawn through said guide means, a portion of each hook temporarily engages one of said spokes to be guided thereby gradually laterally away from said channel.

6. Apparatus according to claim 5 wherein the direction of motion of said spokes makes an angle of about eight degrees with the longitudinal axis of said guide means.

7. Apparatus according to claim 5 wherein adjustable brake means are associated with said spaced aligned spokes so that, as the curved portions of each hook are laterally displaced from said guide means, each hook is placed under sufficient tension to cause in the hook, as it ceases engagement with one of said spokes and enters the baiting chamber, sufficient transverse and rotative motion to securely impale bait within said baiting chamber.

8. Apparatus according to claim 5 wherein said spokes are mounted upon a wheel.

9. Apparatus according to claim 8 wherein wheel mounted spokes are centrally spaced on each side of said guide means.

10. Apparatus according to claim 1 wherein said baiting chamber exit gate is yieldably closed and hinged and includes a series of spaced fingers.

11. Apparatus according to claim 10 wherein said gate is releasably urged in closed position by spring means providing sufficient bias on the gate to maintain bait within said chamber when being impaled on the hook and permit the gate to open under urging of the baited hook as it is drawn from the apparatus.

* * * * *